July 7, 1970  F. B. WILHARM  3,519,513
BONDING OF SHEET MATERIAL
Filed Jan. 21, 1966
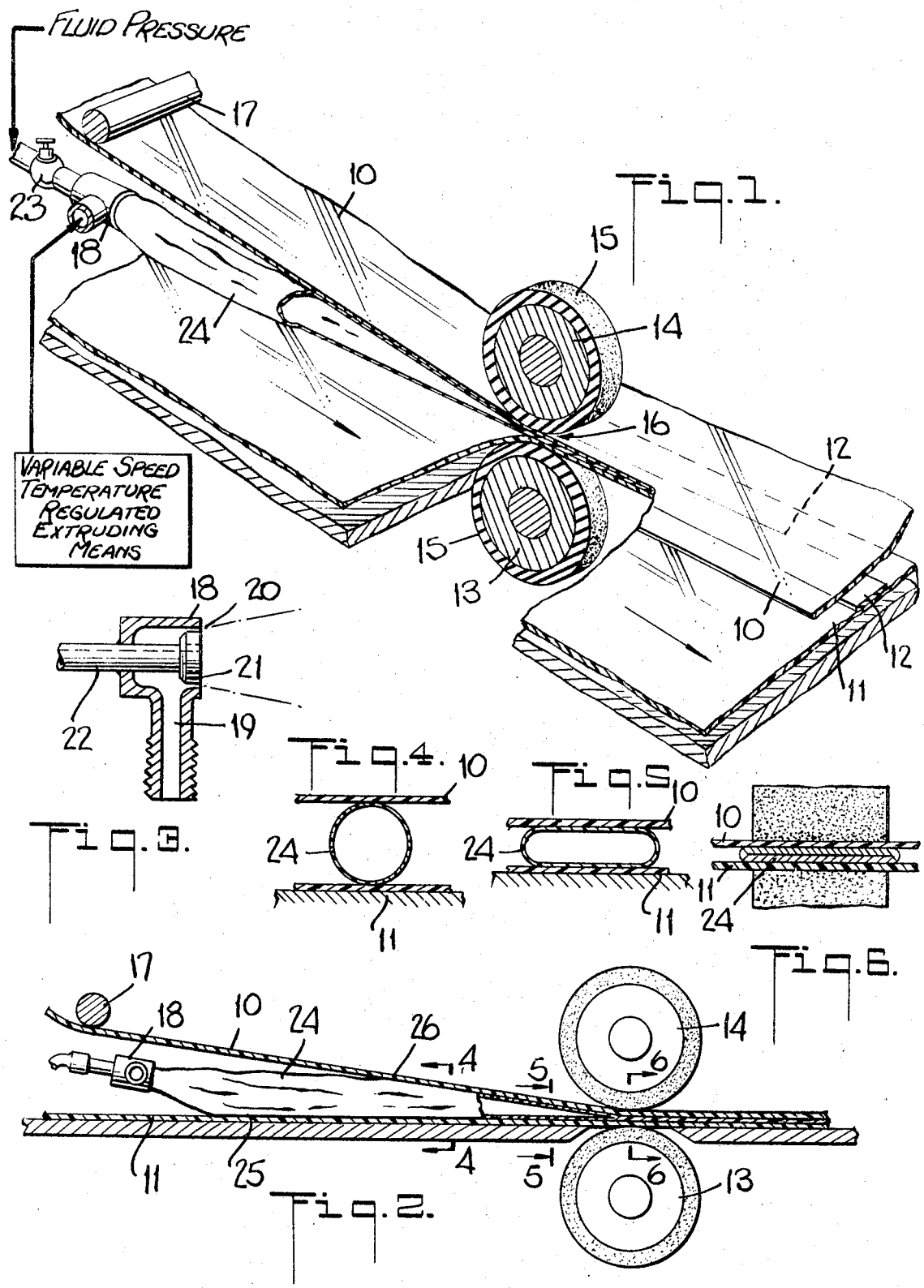

United States Patent Office 3,519,513
Patented July 7, 1970

3,519,513
BONDING OF SHEET MATERIAL
Fred B. Wilharm, Pensacola, Fla., assignor to St. Regis Paper Company, New York, N.Y., a corporation of New York
Filed Jan. 21, 1966, Ser. No. 522,148
Int. Cl. B29b 1/14, 5/00
U.S. Cl. 156—244                 4 Claims

ABSTRACT OF THE DISCLOSURE

This invention relates to a method of bonding together two opposed sheet surfaces including the steps of feeding an inflated hollow tube of bonding material between the surfaces and then bringing the surfaces together and flattening the boding material therebetween.

---

This invention relates to bonding sheet material by the formation of plastic seams or bands along defined lines between overlapping or overlying portions of the sheet material. Among other possible uses the invention is particularly adapted for bonding together overlapping marginal portions for example of plastic sheet or film material such as polyethylene or other heat-sealable material. The invention is also useful for bonding sheet material in the form of paper, paperboard or the like.

It has heretofore been a common practice to bond overlapping marginal portions of plastic sheet or film material, by advancing and guiding the portions so that they converge at a predetermined bonding location where the sheets are pressed together as by utilizing the nip between two pressure rollers. In between the converging sheet portions, a bead of heated plastic material is extruded to pass into the nip between the rollers so as to be more or less flattened between the sheet portions at that location (see U.S. patent to Clark, No. 2,926,723, FIGS. 3, 4 and 8, for example). However, such method has the disadvantage that the bead will become more or less irregularly flattened and tend to be of irregular and excessive thickness at various points. Also it is a problem so to regulate the temperature of the plastic bead that it will not tend excessively to melt or weaken the sheet material, particularly if same is in the nature of plastic films. This difficulty apparently arises from the fact that the plastic mass of the extruded bead necessarily embodies a considerable and concentrated heat content.

With the present invention it has been found that these difficulties may be overcome in a surprisingly satisfactory way by extruding the heated thermoplastic bonding material as an advancing tubular or elongated bubble-like formation containing preferably a gas under some pressure or other formation embodying a substantial amount of entrapped air for example as an expanding cylinder of foamed heat-sealable plastic, located between the converging surfaces which are to be bonded together, such tubular formation being directed into the bonding location so that it preferably at first comes into engagement with one and then the other of said converging surfaces and then becomes compactly flattened and bonded between the sheets as they pass through the nip of a pair of rollers.

Various further and more specific objects, features and advantages of the invention will appear from the description given below, taken in connection with the accompanying drawings, illustrating by way of example preferred forms of the invention.

In the drawings:

FIG. 1 is a somewhat schematic perspective view of a preferred form of arrangement for carrying out the invention;

FIG. 2 is a longitudinal vertical sectional view of the arrangement as shown in FIG. 1;

FIG. 3 is a sectional view of one form of extruder head which may be used; and

FGIS. 4, 5 and 6 are sectional views taken substantially along lines 4—4, 5—5 and 6—6 respectively of FIG. 2.

Referring now to the drawings in further detail and particularly FIG. 1, a pair of overlapping portions of two sheets are indicated at 10 and 11, which are to be bonded together by a band of plastic material, as indicated at 12. As shown, the underlying sheet 11 may be rapidly advanced (in the direction of the arrows shown) by any suitable pulling rollers for example, or partially by the use of a cooperating pair of rollers, as indicated at 13, 14, these rollers preferably being formed of, or covered by, suitable resilient means such as rubber, as indicated at 15, so as resiliently to hold close to each other the overlying sheet portions at the desired bonding location 16. The overlying sheet portion 10 may be suitably guided and controlled in position while being advanced at the same speed as the advance of sheet 11 and with the two sheet portions converging preferably at a low angle with respect to each other, for example an angle of about 10 or 15 degrees. Various rollers, one of which is indicated at 17, may be used to guide the sheet 10 as same, as well as the sheet 11, are being puled for example from rollers or other sources of supply of the sheet material.

As above mentioned, the sheets may be comprised of heat-sealable plastic material such as polyethylene or paper, and in some cases it may be desired to bond plastic-coated paper, or paperboard, or other material such as used for example in the manufacture of single wall or multiwall bags and shipping sacks. The rollers 13, 14, as well as the roller 17 and any of the other rollers used to guide and advance the sheets may, of course, be suitably driven, or some of them may comprise idler rollers.

As further indicated in FIG. 1, some suitable known form of preferably variable-speed and temperature-regulatable extruding means preferably is provided to apply plastic material to an extruder head 18. As better shown in FIG. 3, such extruder head may be formed with an inlet 19 connected to the extruding means and an annular outlet orifice, as indicated at 20 (if the plastic tubular formation is to be used) surrounding a plug-like element 21, carried on a conduit 22, which in turn may be connected through a control valve 23 to a suitable source of gas under pressure, preferably air or other suitable inert or noninflammable gas. The plug-like member 21 may be threaded in place or otherwise suitably removably mounted on the pipe 22 so that same may be replaced by other elements of various diameters depending upon the desired width of the annular extruding orifice 20.

As a result of this arrangement, the thermoplastic material becomes extruded as an advancing tubular or bubble-like formation 24 containing a volume of the gas preferably under sufficient pressure so that the lower surface portions of the bubble, as indicated in FIG. 2, become engaged, as at 25, against the lower sheet 11 at a location preferably considerably in advance of the nip between the rollers 13, 14. The pressure within the bubble also preferably causes the upper side of the bubble to engage the under surface of the upper sheet 10, at a location such as indicated at 26 somewhat in advance of the nip between the rollers 13, 14. The relationship of the bubble formation to the two sheets shortly after contacting therewith is indicated by the somewhat enlarged sectional view of FIG. 4. Shortly thereafter, as indicated in FIG. 5, the bubble formation becomes flattened considerably at its upper and lower surfaces and finally at or about the bonding location between the rollers, the tubular or bubble formation becomes fully and compactly flattened between the sheets 10 and 11. Sometimes less gas pressure may be introduced into the tubular formation, in which case the initial cross-section will be flat as in FIG. 5 or even flatter than there shown. Preferably the nip is made such that the sheets of the material and the bubble formation become substantially flattened together and integrally bonded or sealed together with the inner upper and lower surfaces within the tubular formation also flattened and sealed together. The result will be a band of uniform width and over the width of which the two sheets will be firmly bonded.

By varying the temperature of the extruding means and its speed of operation, as well as by varying the fluid pressure at the valve 23, the size of the bubble or the degree to which same becomes expanded after leaving the extruder, may be adjusted within satisfactory limits. For example, by applying fluid at increased pressure, the cross-section of the bubble as maintained may be enlarged to varying degrees, with the consequence that the effective width of the finished bonded band may be increased. At the same time, by making these various adjustments, the thinness of the walls of the bubble may be varied so as to insure that excessive heat will not be concentrated at any one point coming into contact with the sheet material.

The method has a number of significant advantages. For example, the tubular formation or bubble may be made uniformly thin and of uniform width when flattened and thus forming a band of bonding which will be thin and uniform to a high degree. Thus if for example, a large number of bags having longitudinal seams formed by the invention are to be stacked flatwise, the increased thickness of each occurring by reason of the bonded seam can be kept so slight that the superposed bags may be packed very securely and without danger of having any protrusions at the seam which might injure other bags or items.

With this invention it is unnecessary to provide any cooling means for the pressure rollers at the nip in view of the fact that the heat necessary to soften the extruded plastic will not be concentrated but will be distributed by the thin walls of the flattened bubble over the whole width of the resulting band of bonding. Thus also the heat will become so quickly distributed over the width of the band at or just in advance of the nip, that there will be no danger of melting or otherwise injuring the sheet material and the sheet material may be advanced so rapidly with this invention, that the heat in the bonded region will be satisfactorily carried away.

Since the tubular formation or bubble will become uniformly flattened over a substantial width, it will not tend to deform the sheet material, even though same may be in the form of quite thin films, and furthermore, in view of the above-noted conditions, there will be no danger that the exterior of the plastic sheets will tend to stick to any other sheets or objects.

In accordance with one example of the product made with this invention, two sheets of plastic film of five mil thickness were bonded together with the bonding band of a width of about three-sixteenths of an inch, and in another instance after making various of the above-described adjustments, the band width was increased to about three-eighths of an inch. In another instance, sheet films of one mil thickness were securely bonded along bands about one-eighth inch wide. In each of these cases the thickness at the bonded area was approximately fifty percent greater than the total thickness of the two sheets at unbonded areas and in each case the thickness at the bond was so little greater than at other areas, that the bonded assembly or laminate feels and appears to be quite flat and smooth across the bonded region.

In a typical instance the annular orifice from the extruder was about one-quarter inch in diameter, the width of the orifice being such as to discharge at the point of extrusion, plastic of a thickness of about 0.005 inch. And when the tube formation was expanded by the internal gas pressure to a larger diameter, the bonded band area was approximately three-eighths of an inch wide and quite thin.

The process may be carried out at an exceptionally rapid rate, for example a speed of 1000 feet per minute or more was obtained without encountering any apparent speed limitation, and considerably less thermoplastic bonding material was necessary than is customarily required by the extruded bead method of seaming.

Various thermoplastic heat-sealable materials may be used in the extruder, and these may include polyvinyl and polyvinylidene polymers and copolymers, such as polyvinyl chloride, polyvinyl acetate, polyvinylidene chloride and copolymers thereof. The preferred polymers are polyolefins, particularly polyethylene, polypropylene and copolymers of these materials. The selected heat-sealable material should have a relatively low melting or softening point, particularly if the films to be bonded are thin. Foamable, heat-sealable polymers of the above-mentioned classes which are prepared to include heat-activated blowing agents, are available and may be used in accordance with the last embodiment of the invention described above.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for bonding together superposed edge portions of sheet material comprising the steps of feeding said sheet material in superposed relationship with the adjacent edge portions of each in overlapping relation so as to provide a seam, extruding a hollow thermoplastic tube with a fluid injected therein between said overlapping edge portions, and thereafter compressing said edge portions together and thereby flattening said thermoplastic tube therebetween and thus bringing said superposed portions of sheet material together with the formation becoming compactly flattened and bonded therebetween.

2. Method in accordance with the foregoing claim 1, and in which the sheet material comprises a thermoplastic and the flattened tubular bonding material has its interior flattened walls substantially integrally joined and its exterior flattened surfaces substantially integrally joined respectively to surfaces of said portions of sheet material.

3. Method in accordance with the foregoing claim 1 and in which the sheet material comprises paper and the flattened tubular bonding material has its interior flattened walls substantially integrally joined and its exterior flattened surfaces adhesively jointed respectively to surfaces of said portions of sheet material.

4. Method in accordance with the foregoing claim 1 wherein said fluid injected into said hollow tubular formation is air.

References Cited

UNITED STATES PATENTS

| | | | |
|---|---|---|---|
| 2,510,727 | 6/1950 | Sussenbach. | |
| 2,926,723 | 3/1960 | Clark | 156—367 |
| 3,037,868 | 6/1962 | Rosser | 161—147 |
| 3,062,698 | 11/1962 | Aykanian | 156—306 |
| 3,066,063 | 11/1962 | Ecklund et al. | 156—244 |

MORRIS SUSSMAN, Primary Examiner

U.S. Cl. X.R.

156—295, 306; 161—145